United States Patent
Yoo

(10) Patent No.: US 8,789,184 B2
(45) Date of Patent: Jul. 22, 2014

(54) MOBILE DEVICE HAVING SELF-DEFENSE FUNCTION AGAINST VIRUS AND NETWORK-BASED ATTACKS AND SELF-DEFENSE METHOD USING THE SAME

(75) Inventor: In Seon Yoo, Yangju-si (KR)

(73) Assignee: Samsung SDS Co., Ltd., Seoul (KR)

( * ) Notice: Subject to any disclaimer, the term of this patent is extended or adjusted under 35 U.S.C. 154(b) by 1010 days.

(21) Appl. No.: 12/077,668

(22) Filed: Mar. 20, 2008

(65) Prior Publication Data

US 2009/0165137 A1    Jun. 25, 2009

(30) Foreign Application Priority Data

Dec. 20, 2007    (KR) .......................... 10-2007-0134025

(51) Int. Cl.
H04L 29/06 (2006.01)

(52) U.S. Cl.
CPC .......... H04L 63/145 (2013.01); H04L 63/1416 (2013.01); H04L 63/1425 (2013.01)
USPC ................... 726/24; 726/23; 726/27; 713/188

(58) Field of Classification Search
CPC .............. H04L 63/145; H04L 63/1416; H04L 63/1425
USPC ................................. 726/27, 23, 24; 713/188
See application file for complete search history.

(56) References Cited

U.S. PATENT DOCUMENTS

| | | | | |
|---|---|---|---|---|
| 6,219,706 | B1 * | 4/2001 | Fan et al. ....................... | 709/225 |
| 6,779,033 | B1 * | 8/2004 | Watson et al. ................. | 709/227 |
| 6,826,613 | B1 * | 11/2004 | Wang et al. .................... | 709/227 |
| 7,337,327 | B1 * | 2/2008 | Sallam .......................... | 713/189 |
| 2001/0020245 | A1 * | 9/2001 | Golds et al. .................... | 709/102 |
| 2001/0042200 | A1 * | 11/2001 | Lamberton et al. ........... | 713/151 |

(Continued)

FOREIGN PATENT DOCUMENTS

| | | |
|---|---|---|
| EP | 1 330 096 A2 | 7/2003 |
| KR | 10-2007-0133545 | 1/2008 |
| WO | 2006/132831 A2 | 12/2006 |

OTHER PUBLICATIONS

U.S. Appl. No. 12/077,614, In Seon Yoo.

(Continued)

*Primary Examiner* — Michael Pyzocha
(74) *Attorney, Agent, or Firm* — Sughrue Mion, PLLC

(57) ABSTRACT

Provided are a mobile device having a self-defense function against virus and network-based attacks and a self-defense method using the same. The mobile device includes a virus checking module, which receives information on files required for virus checking on a basis of input/output (I/O) information created from a file system of an operating system, and determines whether or not the files are infected with a virus using distribution of similarity between data; a malicious packet determination module, which examines information on an Internet protocol (IP) packet created from a network to interrupt a denial-of-service attack (DoS attack); and a control module, which receives the I/O information created from the file system of the operating system, selects the files required for the virus checking, and transmits the selected files to the virus checking module, or receives information on the IP packet created from the network to transmit the received information to the malicious packet determination module, thereby preventing damage caused by the virus in advance, and effectively preventing a denial-of-service attack (DoS attack) caused by wireless network resource depletion and battery consumption that may occur in a wireless environment.

16 Claims, 17 Drawing Sheets

(56) References Cited

U.S. PATENT DOCUMENTS

| | | | |
|---|---|---|---|
| 2002/0031134 A1* | 3/2002 | Poletto et al. | 370/401 |
| 2002/0103916 A1 | 8/2002 | Chen et al. | |
| 2003/0200464 A1* | 10/2003 | Kidron | 713/201 |
| 2004/0025015 A1* | 2/2004 | Satterlee et al. | 713/164 |
| 2004/0098617 A1* | 5/2004 | Sekar | 713/201 |
| 2004/0215976 A1* | 10/2004 | Jain | 713/201 |
| 2004/0236884 A1* | 11/2004 | Beetz | 710/68 |
| 2005/0141508 A1* | 6/2005 | Ogawa | 370/394 |
| 2005/0216954 A1* | 9/2005 | Ramaiah et al. | 726/22 |
| 2006/0007903 A1* | 1/2006 | Hammell et al. | 370/342 |
| 2006/0156405 A1* | 7/2006 | Forman et al. | 726/24 |
| 2006/0190720 A1* | 8/2006 | Ozaki et al. | 713/160 |
| 2006/0229022 A1* | 10/2006 | Bu et al. | 455/69 |
| 2007/0044150 A1* | 2/2007 | Dalal et al. | 726/22 |
| 2009/0158434 A1* | 6/2009 | Yoo | 726/24 |
| 2010/0077480 A1* | 3/2010 | Yoo | 726/24 |
| 2010/0088763 A1* | 4/2010 | Yoo | 726/22 |
| 2010/0299753 A1* | 11/2010 | Yoo | 726/22 |

OTHER PUBLICATIONS

Communication dated Mar. 29, 2010, issued by the Korean Intellectual Property Office in counterpart Korean Application No. 10-2007-0134025.

Communication dated Oct. 29, 2009, issued by the Korean Intellectual Property Office in counterpart Korean Application No. 10-2007-0134025.

DeLooze, Lori L., "Attack Characterization and Intrusion Detection using an Ensemble of Self-Organizing Maps", 2006 International Joint Conference on Neural Networks, Jul. 16-21, 2006, pp. 2121-2128.

* cited by examiner

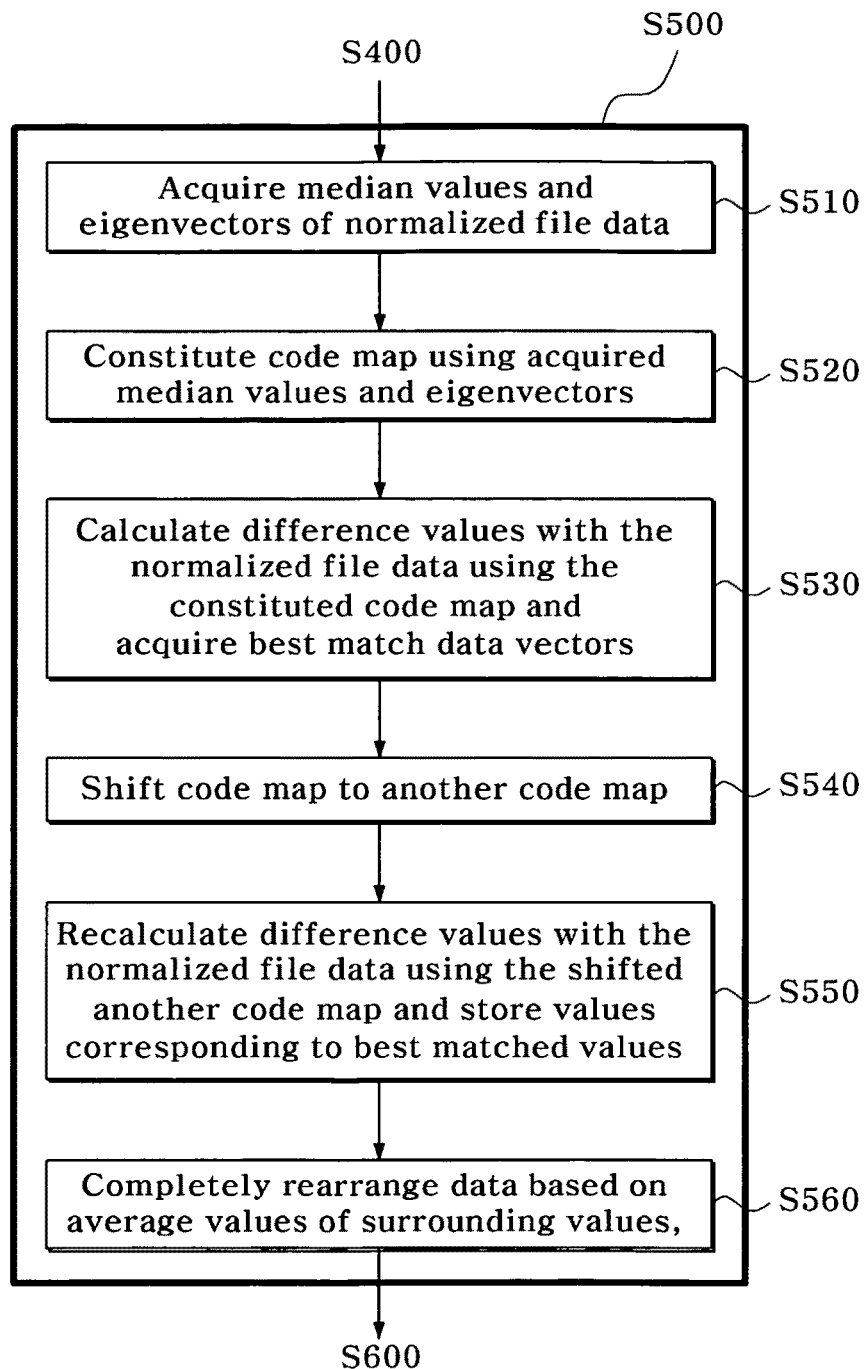

| | | | | | | | |
|---|---|---|---|---|---|---|---|
| 24129.1 | 20340.3 | 23190.7 | 23629.8 | 19367.9 | 22311.2 | 24148.3 | 21672.6 |
| 20839.7 | 18164.1 | 20361.4 | 21115.9 | 18384.5 | 20839.1 | 22101.3 | 21562.7 |
| 14411.5 | 14993 | 15461.2 | 17736.2 | 15260 | 18068.9 | 18641.3 | 21571.5 |
| 8414.91 | 12355.2 | 9814.07 | 14620.4 | 8480.12 | 15002.7 | 15553.4 | 21546.2 |
| 5112.1 | 10431 | 4608.57 | 11809.6 | -2023.34 | 11661.8 | 12270.4 | 19973.7 |
| 1835.45 | 8076.93 | 1628.31 | 10021.4 | -12590.1 | 7613.82 | 8548.16 | 16714.6 |
| -4539.96 | 4589.11 | 1298.18 | 9070.96 | -17351.6 | 2203.61 | 5679.94 | 12179 |
| -12995.1 | 2443.94 | 2216 | 7922.7 | -13139.8 | -3445.28 | 3428.78 | 7232.55 |
| -19637.9 | 2842.83 | 3665.27 | 5769.45 | -4784.97 | -7437.34 | 2507.05 | 2127.02 |
| -21910.2 | 4044.92 | 5548.93 | 1265.92 | 556.37 | -7842.5 | 4815.65 | -6501.24 |
| -19057.4 | 4881.61 | 7861.67 | -5890.4 | 274.195 | -3706.02 | 9464.26 | -17828.2 |
| -14481 | 5011.44 | 9353.45 | -11965.7 | -2300.22 | 927.089 | 12008.6 | -25129.4 |
| 21361 | 18492.9 | 21166.5 | 21707.7 | 18189.3 | 18790.5 | 19788.8 | 18948.8 |
| 16432.7 | 15361.1 | 16944.5 | 17707.8 | 16410.5 | 17058.7 | 17354.7 | 18332.5 |
| 11016.5 | 12837.7 | 12253.4 | 14075.3 | 13243.8 | 15297.3 | 16099.9 | 18390.3 |
| 6572.49 | 10947.2 | 6324.81 | 10247.4 | 6481.77 | 12974.4 | 15454.7 | 18341.3 |
| 3721.84 | 9191.87 | 1131.42 | 7380.22 | -3054.48 | 9854.04 | 12859.9 | 16425.8 |

FIG. 5C

| | | | | | | | | | | | |
|---|---|---|---|---|---|---|---|---|---|---|---|
| 62 | 53 | 43 | 41 | 27 | 29 | 31 | 25 | 26 | 29 | 30 | 44 |
| 56 | 47 | 53 | 43 | 31 | 34 | 35 | 44 | 39 | 26 | 28 | 44 |
| 59 | 56 | 50 | 50 | 39 | 38 | 49 | 68 | 75 | 52 | 24 | 14 |
| 49 | 50 | 46 | 38 | 41 | 51 | 79 | 87 | 84 | 48 | 19 | 24 |
| 49 | 38 | 39 | 39 | 38 | 35 | 59 | 83 | 84 | 70 | 37 | 29 |
| 36 | 29 | 30 | 33 | 27 | 35 | 63 | 78 | 65 | 37 | 28 | 30 |
| 50 | 36 | 23 | 28 | 34 | 31 | 30 | 44 | 45 | 36 | 32 | 40 |
| 56 | 33 | 25 | 33 | 35 | 27 | 20 | 29 | 24 | 31 | 49 | 60 |

FIG. 6
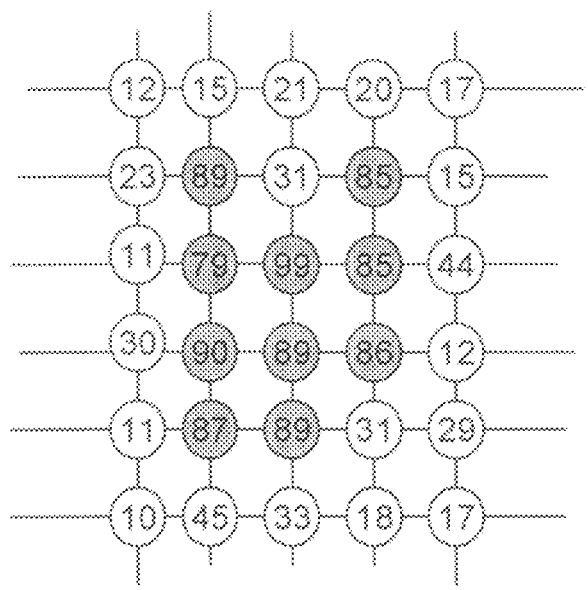
(a)
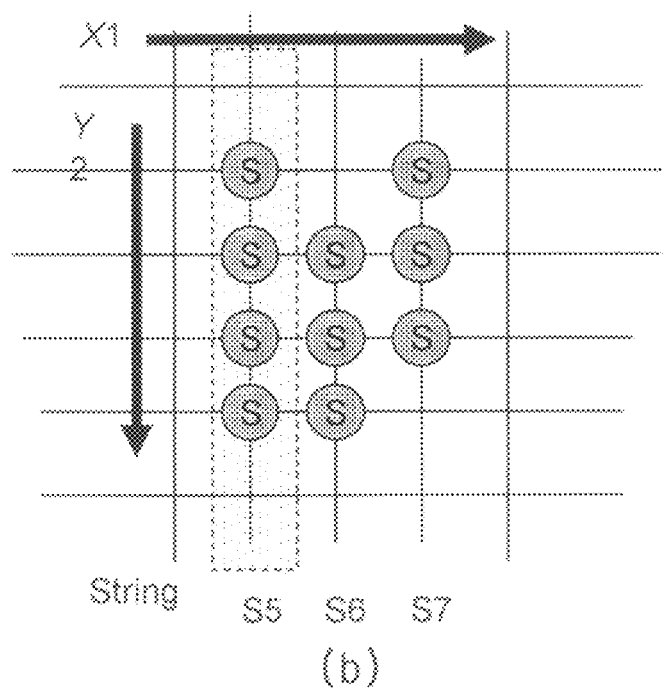
(b)

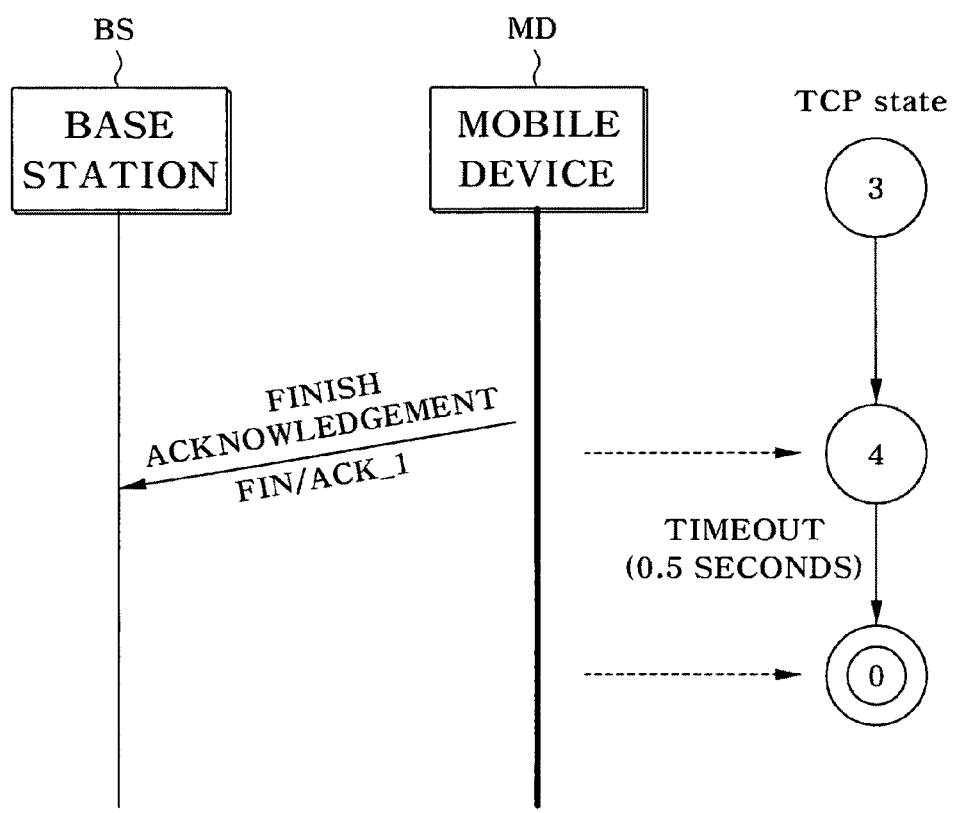

MOBILE DEVICE HAVING SELF-DEFENSE FUNCTION AGAINST VIRUS AND NETWORK-BASED ATTACKS AND SELF-DEFENSE METHOD USING THE SAME

CROSS REFERENCE TO RELATED PATENT APPLICATION

This U.S. patent application relates to and claims priority to Korean Patent Application No. 10-2007-0134025, which was filed on Dec. 20, 2007 and the entire disclosure is incorporated herein by reference.

BACKGROUND OF THE INVENTION

1. Field of the Invention

The present invention relates, in general, to a mobile device having a self-defense function against virus and network-based attacks and a self-defense method using the same and, more particularly, to a mobile device having a self-defense function against virus and network-based attacks and a self-defense method using the same, in which the mobile device itself performs a self-defense function, thereby preventing damage caused by the virus in advance, and effectively preventing a denial-of-service attack (DoS attack) caused by wireless network resource depletion and battery consumption that may occur in a wireless environment.

2. Description of the Related Art

As Internet services spread from wired services to wireless services, and as mobile devices diversify in type and service, a user can access the Internet through a mobile device anywhere.

Thus, it is predicted that denial-of-service attacks (DoS attacks) occurring in the wired services will also gradually spread to the wireless services. Due to restriction on resources, damage caused by the DoS attack may be more fatal in the wireless services.

Even when existing security services provided by wire are used as they are, they can be used identically on the side of a server. However, security technologies applied to the mobile device by wireless are still insufficient. As such, when virus attacks and network-based packet attacks occur in the mobile device, a method by which the mobile device can protect itself against these attacks is necessary.

Meanwhile, since known antivirus technologies depend on the virus signature DB, they are unable to detect the virus when the virus that is not registered in the DB enters.

Further, since the known antivirus technologies do not allow the mobile devices to verify, determine and interrupt malicious packets by themselves, the mobile devices cannot prevent damage, such as battery consumption and wireless resource consumption, resulting from attacks of the malicious packets.

For example, since a user uses a mobile device such as a laptop computer or a smart phone while in motion, the mobile device must be equipped with the self-defense function against these virus attacks under a wireless environment.

SUMMARY OF THE INVENTION

Accordingly, the present invention has been made in view of the above problems occurring in the related art, and an object of the present invention is to provide a mobile device having a self-defense function against virus and network-based attacks and a self-defense method using the same, in which, as opposed to an existing method of detecting the virus depending on information on virus signatures, it determines by itself, without using virus information, whether or not the file is infected with a virus using an artificial intelligence method involving distribution of similarity between data, thereby preventing damage caused by the virus in advance, and effectively protecting against a denial-of-service attack (DoS attack) that continuously transmit transmission control protocol (TCP) packets to a mobile device in a wireless environment by use of a TCP protocol, which not only depletes wireless network resources but also consumes power of a battery of the mobile device.

In order to achieve the above object, according to one aspect of the present invention, there is provided a mobile device for wireless communication, including: a virus checking module, which receives information on files required for virus checking on a basis of input/output (I/O) information created from a file system of an operating system, and determines whether or not the files are infected with a virus using distribution of similarity between data; a malicious packet determination module, which examines information on an Internet protocol (IP) packet created from a network to interrupt a denial-of-service attack (DoS attack); and a control module, which receives the I/O information created from the file system of the operating system, selects the files required for the virus checking, and transmits the selected files to the virus checking module, or receives information on the IP packet created from the network to transmit the received information to the malicious packet determination module.

Here, the mobile device may further include a file system monitoring module, which is registered in the operating system beforehand, monitors all pieces of I/O information created from a file system driver, and transmits the monitored information to the control module.

The mobile device may further include a network packet monitoring module, which is registered in the operating system beforehand, monitors IP packets created from the network, and transmits the monitored information to the control module.

Further, the mobile device may include one selected from a desktop computer, a laptop computer, a personal digital assistant (PDA), a mobile phone, a WebPDA, and a transmission control protocol (TCP) networking assisted wireless mobile device.

The virus checking module may copy an original file based on the provided file information, convert and simplify data of the copied file, normalize the simplified file data, acquire distribution of similarity between data using the normalized file data, analyze the acquired distribution of similarity between data, and determine that the file is virus-infected when a preset dense distribution pattern exists.

The distribution of similarity between data may be acquired by constituting a code map optimized for the normalized file data using a typical Self-Organizing Map (SOM) learning algorithm, and forming a new matrix on the basis of average values of surrounding values.

The original file may include one of a general file and an executable file.

The original file may already exist in the mobile device or may be introduced from an outside source through a specific path.

The specific path may include one selected from Internet, e-mail, Bluetooth, and ActiveSync.

The malicious packet determination module may cause a base station to transmit a connection request packet (SYN packet) for transmission control protocol (TCP) connection to the mobile device, and cause the mobile device to transmit a connection request acknowledgement packet (SYN/ACK_1 packet) to the base station when the mobile device receives the transmitted SYN packet; cause the base station to transmit an acknowledgement packet (ACK_2 packet) to the mobile device in response to the SYN/ACK_1 packet when the base station receives the transmitted SYN/ACK_1 packet, and complete the TCP connection when the mobile device receives the transmitted ACK_2 packet; and release the completed TCP connection when the mobile device receives a packet, to which a reset or connection request flag (RST or SYN flag) is set, from the base station after the TCP connection is completed.

The malicious packet determination module may determine that the TCP connection is abnormally released when the mobile device receives no packet for a preset timeout time after the TCP connection is completed, and safely release the TCP connection.

The malicious packet determination module may cause a base station to transmit a SYN packet for TCP connection to the mobile device, and cause the mobile device to transmit a SYN/ACK_1 packet to the base station when the mobile device receives the transmitted SYN packet; cause the base station to transmit a disconnection packet (FIN packet) to the mobile device when the base station receives the transmitted SYN/ACK_1 packet, and interrupt the TCP connection when the mobile device receives the transmitted FIN packet.

The malicious packet determination module may cause a base station to transmit a connection request packet (SYN packet) for transmission control protocol (TCP) connection to the mobile device, and cause the mobile device to transmit a connection request acknowledgement packet (SYN/ACK_1 packet) to the base station when the mobile device receives the transmitted SYN packet; cause the base station to transmit an acknowledgement disconnection packet (ACK_2/FIN packet), to which a FIN flag is set, to the mobile device together with acknowledgement (ACK_2) in response to the SYN/ACK_1 packet when the base station receives the transmitted SYN/ACK_1 packet; and interrupt the TCP connection when the mobile device receives the transmitted ACK_2/FIN packet.

The malicious packet determination module may cause a base station to transmit a connection request packet (SYN packet) for transmission control protocol (TCP) connection to the mobile device, and cause the mobile device to transmit a connection request acknowledgement packet (SYN/ACK_1 packet) to the base station when the mobile device receives the transmitted SYN packet; cause the base station to transmit the SYN packet to the mobile device again when the base station receives the transmitted SYN/ACK_1 packet; and interrupt the TCP connection when the mobile device receives the re-transmitted SYN packet.

The malicious packet determination module may determine that the TCP connection is abnormally released when the mobile device receives no packet for a preset timeout time after the SYN/ACK_1 packet is transmitted to the base station, and safely release the TCP connection.

The malicious packet determination module may safely release the TCP connection when the mobile device does not receive an acknowledgement packet (ACK_3 packet) for a preset timeout time after transmitting a disconnection acknowledgement packet (FIN/ACK packet) for normally releasing the TCP connection to the base station in a state where the TCP connection is completed between the base station and the mobile device.

According to another aspect of the present invention, there is provided a method of performing a self-defense function against virus and network-based attacks on a mobile device having a virus checking module and a malicious packet determination module. The method includes the steps of: a) monitoring all pieces of input/output (I/O) information created from a file system driver of an operating system; b) selecting files required for virus checking on a basis of the monitored I/O information; c) receiving information on the selected files through the virus checking module to determine whether or not the files are infected with a virus using distribution of similarity between data; d) monitoring an Internet protocol (IP) packet created from a network; and e) examining information on the monitored IP packet through the malicious packet determination module to interrupt a denial-of-service attack (DoS attack).

Here, step c) may include the sub-steps of: c-1) copying an original file, and converting and simplifying data of the copied file; c-2) normalizing the simplified file data; c-3) acquiring distribution of similarity between data using the normalized file data; and c-4) analyzing the acquired distribution of similarity between data, and determining that the file is virus-infected when a preset dense distribution pattern exists.

Sub-step c-1) may include checking according to a format of the copied file whether or not a file header is deliberately changed prior to converting and simplifying the data of the copied file.

Sub-step c-1) may include checking a format of the copied file prior to converting and simplifying the data of the copied file, and determining that the file is virus-infected when a part changed deliberately by the virus is found.

The original file may include one of a general file and an executable file.

In sub-step c-3), the distribution of similarity between data may be acquired by constituting a code map optimized for the normalized file data using a typical Self-Organizing Map (SOM) learning algorithm, and forming a new matrix on the basis of average values of surrounding values.

Sub-step c-3) may include the sub-steps of: c-3-1) acquiring median values and eigenvectors of the normalized file data, and constituting a code map using the acquired median values and eigenvectors; c-3-2) calculating difference values with the normalized file data using the constituted code map, and acquiring best match data vectors; c-3-3) shifting the code map to another code map in order to calculate whole data once again using the acquired best match data vectors, recalculating difference values with the normalized file data using the shifted another code map, and storing values corresponding to best matched values; and c-3-4) rearranging the data on a basis of the average values of the surrounding values, and forming a new matrix.

Step e) may include the sub-steps of: transmitting, by a base station, a connection request packet (SYN packet) for transmission control protocol (TCP) connection to the mobile device, and transmitting, by the mobile device, a connection request acknowledgement packet (SYN/ACK_1 packet) to the base station when the mobile device receives the transmitted SYN packet; transmitting, by the base station, an acknowledgement packet (ACK_2 packet) to the mobile device in response to the SYN/ACK_1 packet when the base station receives the transmitted SYN/ACK_1 packet; completing the TCP connection when the mobile device receives the transmitted ACK_2 packet; and releasing the completed TCP connection when the mobile device receives a packet, to which a reset or connection request flag (RST or SYN flag) is set, from the base station after the TCP connection is completed.

It may be determined that the TCP connection is abnormally released when the mobile device receives no packet for a preset timeout time after the TCP connection is completed, and the TCP connection may be safely released.

Step e) may include the sub-steps of: transmitting, by a base station, a SYN packet for TCP connection to the mobile device, and transmitting, by the mobile device, a SYN/ACK_1 packet to the base station when the mobile device receives the transmitted SYN packet; transmitting, by the base station, a disconnection packet (FIN packet) to the mobile device when the base station receives the transmitted SYN/ACK_1 packet; and interrupting the TCP connection when the mobile device receives the transmitted FIN packet.

Step e) may include the sub-steps of: transmitting, by a base station, a connection request packet (SYN packet) for transmission control protocol (TCP) connection to the mobile device, and transmitting, by the mobile device, a connection request acknowledgement packet (SYN/ACK_1 packet) to the base station when the mobile device receives the transmitted SYN packet; transmitting, by the base station, an acknowledgement disconnection packet (ACK_2/FIN packet), to which a FIN flag is set, to the mobile device together with acknowledgement (ACK_2) in response to the SYN/ACK_1 packet when the base station receives the transmitted SYN/ACK_1 packet; and interrupting the TCP connection when the mobile device receives the transmitted ACK_2/FIN packet.

Step e) may include the sub-steps of: transmitting, by a base station, a connection request packet (SYN packet) for transmission control protocol (TCP) connection to the mobile device, and transmitting, by the mobile device, a connection request acknowledgement packet (SYN/ACK_1 packet) to the base station when the mobile device receives the transmitted SYN packet; transmitting, by the base station, the SYN packet to the mobile device again when the base station receives the transmitted SYN/ACK_1 packet; and interrupting the TCP connection when the mobile device receives the re-transmitted SYN packet.

It may be determined that the TCP connection is abnormally released when the mobile device receives no packet for a preset timeout time after the SYN/ACK_1 packet is transmitted to the base station, and the TCP connection may be safely released.

Step e) may include safely releasing the TCP connection when the mobile device does not receive an acknowledgement packet (ACK_3 packet) for a preset timeout time after transmitting a disconnection acknowledgement packet (FIN/ACK packet) for normally releasing the TCP connection to the base station in a state where the TCP connection is completed between the base station and the mobile device.

According to yet another aspect of the present invention, there is provided a computer readable medium recording a program that can execute the above-described method using a computer.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a detailed flow chart for acquiring distribution of similarity between data that is applied to an embodiment of the present invention;

FIGS. 5A through 5E illustrate actual data for explaining a virus-infected file that is determined by a method of detecting virus infection of a file according to an embodiment of the present invention;

FIG. 6 illustrates actual data for explaining a dense distribution pattern that is applied to an embodiment of the present invention;

FIG. 14 is a view for explaining the flow of a packet and TCP state transition in a fifth example of abnormal TCP connection.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
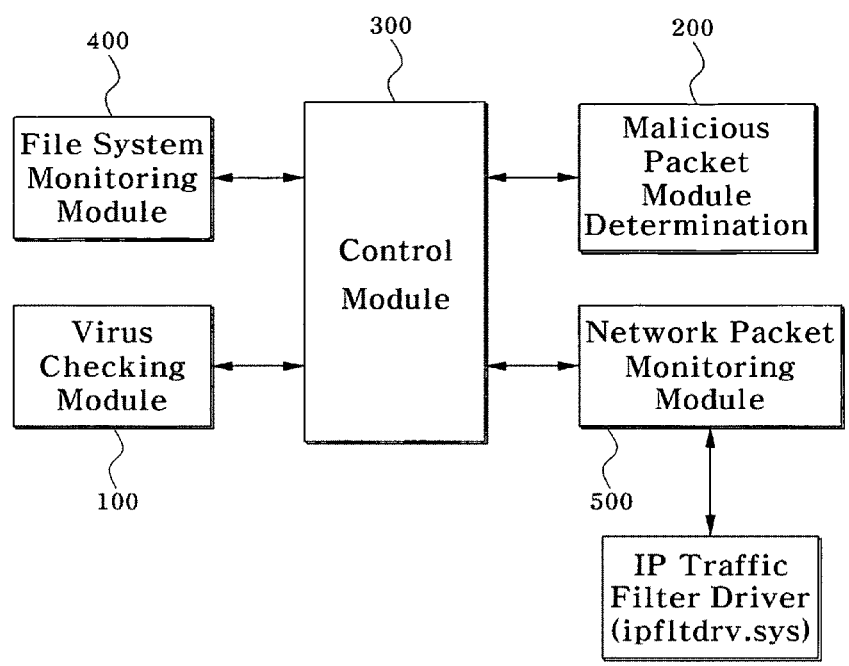
FIG. 1 is a schematic block diagram of a mobile device having a self-defense function against virus and network-based attacks according to an embodiment of the present invention.

FIG. 1 is a schematic block diagram of a mobile device having a self-defense function against virus and network-based attacks according to an embodiment of the present invention.

Referring to FIG. 1, the mobile device having a self-defense function against virus and network-based attacks generally includes a virus checking module 100, a malicious packet determination module 200, and a control module 300.

Here, the virus checking module 100 functions to receive information on files required for virus checking on the basis of input/output (I/O) information created from the file system of an operating system, determine whether or not the files are infected with a virus using distribution of similarity between data, and then transmit the determination results to the control module 300. The virus checking module will be discussed in detail in the following description of FIGS. 2 through 6.

The malicious packet determination module 200 parses information on an Internet protocol (IP) packet created from a network to determine whether or not a specific IP port has malicious intent, and transmits the determination results to the control module 300, thereby functioning to interrupt an address of the specific IP port, i.e. a denial-of-service attack (DoS attack). The malicious packet determination module will be discussed in detail in the following description of FIGS. 7 through 14.

The control module 300 takes charge of overall control of the mobile device, provides a user interface (UI) for communication between each module and the user, and can define each set value.

In particular, the control module 300 receives the I/O information created from the file system of the operating system, manually or automatically selects the files required for the virus checking according to preset conditions, and transmits the selected files to the virus checking module 100. Further, the control module 300 receives information on the IP packet created from the network to transmit the received information to the malicious packet determination module 200.

Further, the control module 300 can visually or aurally inform the user of the result of virus infection determination, which is transmitted from the virus checking module 100.

In addition, the mobile device having a self-defense function against virus and network-based attacks further includes a file system monitoring module 400, which is registered in the operating system beforehand, monitors all pieces of I/O information created from a file system driver, and transmits the monitored information to the control module 300.

In detail, the file system monitoring module 400 is registered as an upper filter driver in the operating system, monitors all pieces of I/O information created from the file system driver, and transmits the monitored information to the control module 300.

At this time, the control module 300 transmits information for registering a file system filter driver to the file system monitoring module 400 in order to monitor the file system. The file system monitoring module 400 captures all pieces of I/O information created from the file system of the operating system, and transmits them to the control module 300.

Further, the mobile device having a self-defense function against virus and network-based attacks further includes a network packet monitoring module 500, which is registered in the operating system beforehand, monitors IP packets created from the network, and transmits the monitored information to the control module 300.

In detail, the network packet monitoring module 500 is registered as a kernel mode driver in the operating system in order to capture and receive the IP packets from an IP traffic filter driver (ipfltdrv.sys), monitors the received IP packets, and transmits the monitored information to the control module 300.

Since the control module 300 cannot directly access the IP traffic filter driver (ipfltdrv.sys) that is the kernel mode driver, the network packet monitoring module 500 serves as an intermediary.

This network packet monitoring module 500 receives information on the IP packets from the IP traffic filter driver (ipfltdrv.sys), and transmits the received information to the control module 300. The network packet monitoring module 500 receives the IP port addresses intended for interruption from the control module 300, and requests that the IP traffic filter driver (ipfltdrv.sys) interrupts the IP port addresses, which are determined to be malicious through the malicious packet determination module 200.

Here, the IP traffic filter driver (ipfltdrv.sys) is realized as a driver that is able to receive and filter the IP packets from a Windows kernel in a Windows system in a manner such that a general filter driver is made. The IP traffic filter driver will do for another operating system by realizing a driver capable of receiving and filtering IP traffic from a kernel of the operating system.

Meanwhile, a virus check part checked by the virus checking module 100 and a malicious pack check part checked by the malicious packet determination module 200 operate in parallel rather than in sequence.

As described above, the mobile device having a self-defense function against virus and network-based attacks according to an embodiment of the present invention is preferably realized as any one selected from, for instance, a desktop computer, a laptop computer, a personal digital assistant (PDA), a mobile phone, a WebPDA, or a transmission control protocol (TCP) networking assisted wireless mobile device.

Now, the functions of the virus checking module 100 applied to an embodiment of the present invention will be described in detail. Meanwhile, it should be noted that, as long as separate description is not made, the virus checking module 100 is operated as a subject (main entity).

First, a method of detecting virus infection of a file in the virus checking module 100 applied to an embodiment of the present invention can effectively determine whether or not the file is infected with a virus, which enters into a mobile device (e.g. a desktop computer, a laptop computer, a personal digital assistant (PDA), a mobile phone, a WebPDA, or a transmission control protocol (TCP) networking assisted wireless mobile device) from an outside source through any path, regardless of whether the file be received through Bluetooth, downloaded through the Internet, or received through ActiveSync.

In this manner, when internal files are infected with the virus due to the file received from the outside source, the method can effectively determine whether the files received from the outside source are infected with the virus.

Meanwhile, the virus infection of the file(s) can be divided into two types: one is macro virus infection in which a general file such as an MS Word file or an Excel file is infected; and the other is virus infection in which an executable file ending with a "com" or "exe" extension is infected.

Figure 2A:
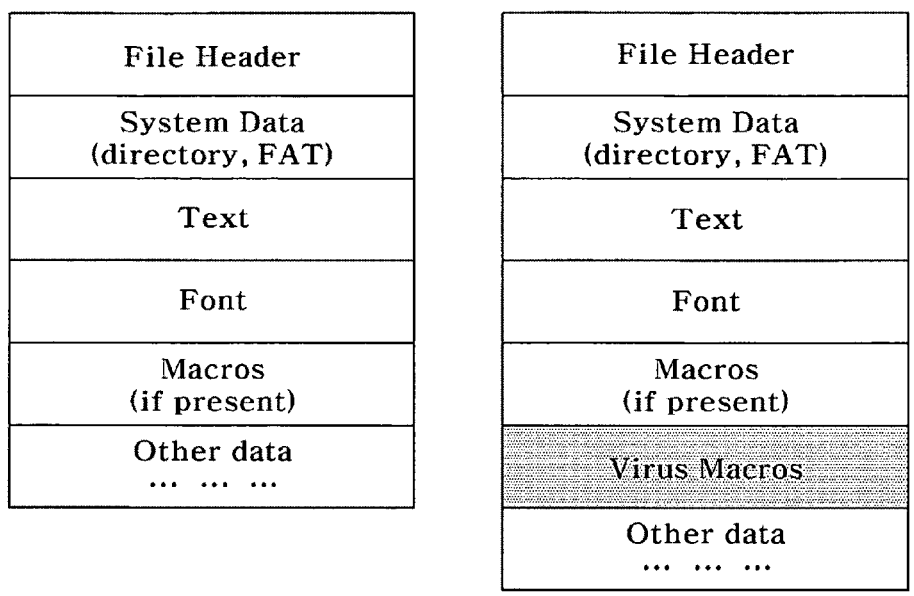
FIGS. 2A and 2B are views illustrating virus-infected parts of general and executable files, which are applied to an exemplary embodiment of the present invention.
Figure 2B:
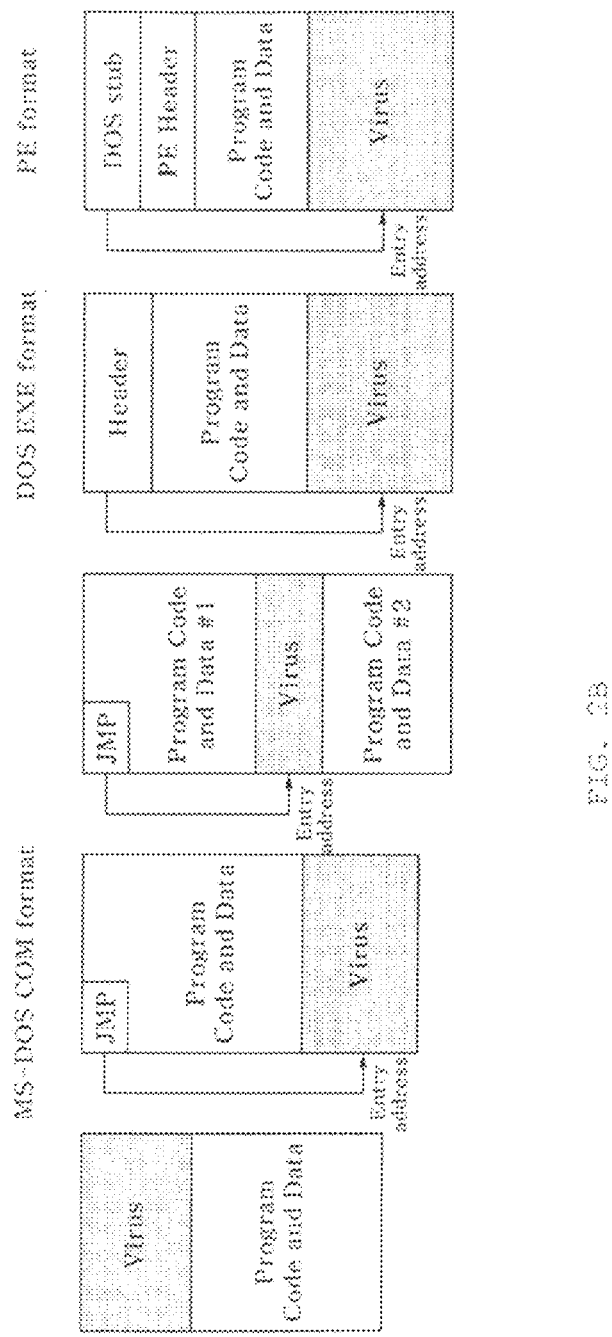

FIGS. 2A and 2B are views illustrating virus-infected parts of general and executable files, which are applied to an exemplary embodiment of the present invention.

FIG. 2A shows the case of the macro virus infection. Referring to FIG. 2A, a macro virus is inserted into a part where a macro enters a document file such as an MS Word file or an Excel file.

Referring to FIG. 2B, a virus is inserted into a COM or EXE file of MS-DOS or a portable executable (PE) file of Windows. In other words, the executable file is infected with the virus.

Figure 3:
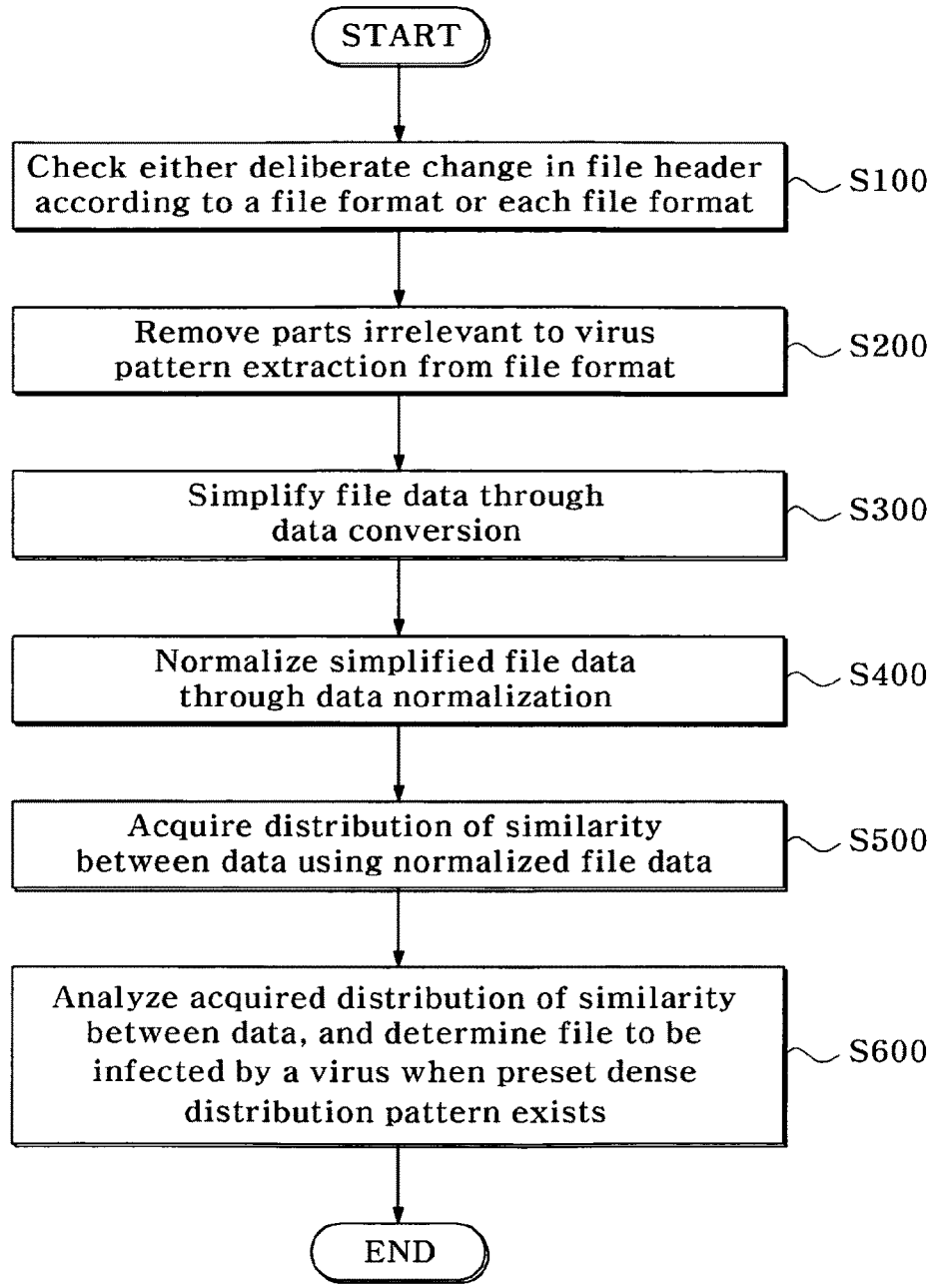
FIG. 3 is a schematic flow chart illustrating a method of detecting virus infection of a file according to an embodiment of the present invention.

FIG. 3 is a schematic flow chart illustrating a method of detecting virus infection of a file in a virus checking module applied to an exemplary embodiment of the present invention.

Referring to FIG. 3, first, an original file is copied and read, and then it is checked according to a file format whether or not a file header is deliberately changed, or each file format is checked. When a part deliberately changed by a virus is discovered before checking virus patterns, the file which has the changed part should be filtered as malicious one (S100).

Then, when the change in the file format is completely checked, parts irrelevant to extraction of the virus pattern are removed from the file format (S200). File data after removing irrelevant parts is simplified through data conversion (S300). At this time, the data conversion refers to conversion of binary format file data into short integer format file data.

Afterwards, the file data simplified in step S300 is normalized through data normalization (S400). In other words, the normalization refers to standardization of the simplified file data by converting it into data having a specific range (e.g. [0, 1]).

Subsequently, distribution of similarity between data is acquired using the file data normalized in step S400 (S500). The distribution of similarity between data is analyzed. Thereby, if a preset dense distribution pattern exists, it is determined that a corresponding file is infected with the virus (S600).

Here, the dense distribution pattern refers to a pattern in which the data are densely distributed around a certain point. In this manner, the virus-infected data show the dense data distribution. Thus, it can be easily found based on the dense data distribution whether or not the data are infected with the virus.

FIG. 4 is a detailed flow chart illustrating a method of acquiring distribution of similarity between data that is applied to an exemplary embodiment of the present invention.

Referring to FIG. 4, the distribution of similarity between data that is applied to an exemplary embodiment of the present invention can be acquired through a plurality of data calculation processes. More specifically, the distribution of similarity between data can be acquired by constituting a code map optimized for the similarity of the file data normalized in step S400 of FIG. 3 using a typical Self-Organizing Map (SOM) learning algorithm, and forming a new matrix on the basis of average values of surrounding values.

In detail, first, median values and eigenvectors of the normalized file data are acquired (S510), and then the code map is constituted using the acquired median values and eigenvectors (S520).

Afterwards, using the codemap generated in step 520, difference values with the normalized file data are calculated, thereby obtaining vectors that best match the normalized file data, i.e., best match data (S530).

Subsequently, by the best match data vectors obtained in step 530, the codemap is changed into another map to recalculate all of the data (step 540). Then, difference values with the normalized file data are recalculated, and values corresponding to a small difference value, i.e., best-matched values, are mainly stored (step 550).

Then, the data are completely rearranged on the basis of the average values of the surrounding values, thereby constituting a new matrix (S560).

Meanwhile, the typical SOM leaning algorithm is applied in steps S510 through S550, and is disclosed in detail in well-known documents, [Teuvo Kohonen, "Self-Organization and Associative Memory," 3rd edition, New York: Springer-Verlag, 1998] and [Teuvo Kohonen, "Self-Organizing Maps," Springer, Berlin, Heidelberg, 1995].

Figure 5A:
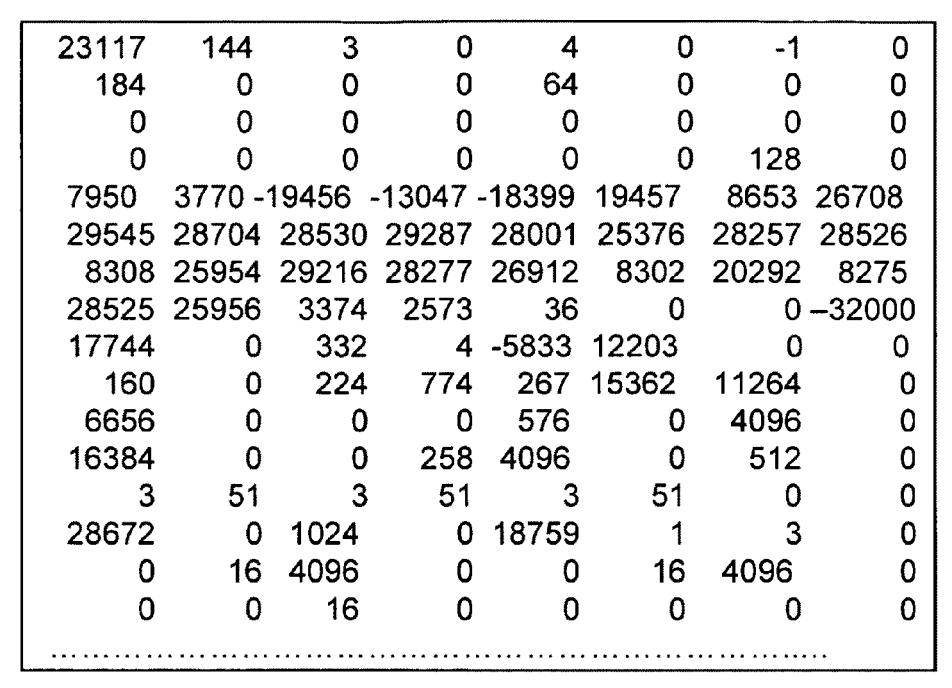
Figure 5D:
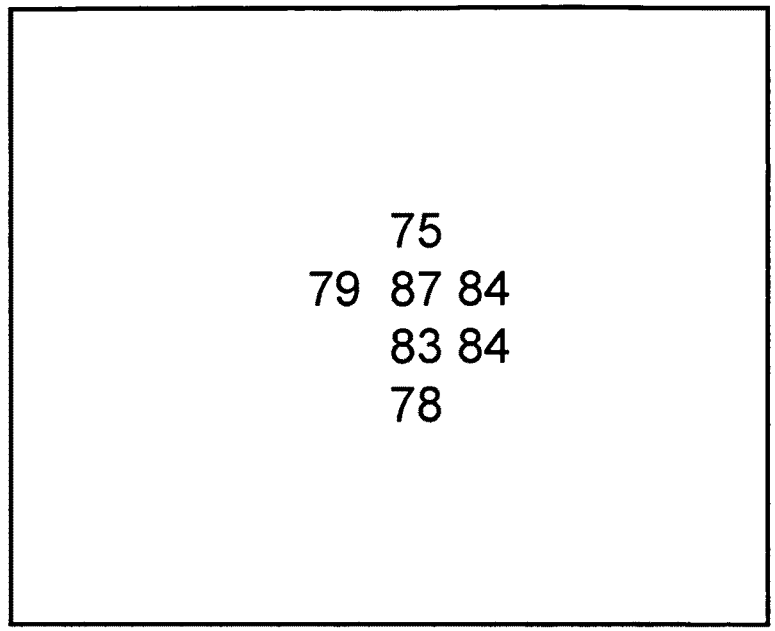
Figure 5E:
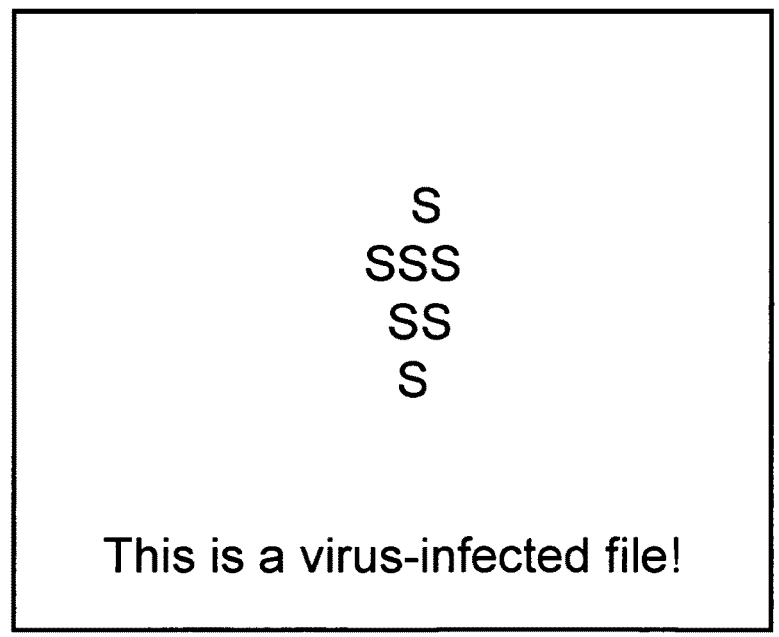

FIGS. 5A through 5E illustrate actual data of a virus-infected file that is determined by a method of detecting virus infection of a file according to an exemplary embodiment of the present invention. FIG. 5A illustrates a part of data that is converted from a binary format into a short integer format. FIG. 5B illustrates a part of data after simplified file data is normalized. FIG. 5C illustrates a part of data that is acquired by constituting a new matrix after an SOM learning algorithm is performed on the data of FIG. 5B. FIG. 5D illustrates data that acquire distribution of similarity between data by leaving data values greater than a preset reference value (e.g. 72) among the data values acquired in FIG. 5C, and by removing the remaining data values. FIG. 5E illustrates data that are replaced with a character, "S," so as to easily recognize the data acquired in FIG. 5D.

FIG. 6 illustrates actual data of a dense distribution pattern that is applied to an exemplary embodiment of the present invention. (a) and (b) of FIG. 6 correspond to FIGS. 5D and 5E. In (b) of FIG. 6, when a group of "S" characters is shown in the state where it is occupied by at least ¾ of a square, this can be determined as a "dense distribution pattern."

Meanwhile, the "S" characters may cover the new matrix (this is shown when all analogies of data are similar to each other). In this case, it is not determined as the dense distribution pattern although the "S" characters are collected at one place.

Hereinafter, the functions of the malicious packet determination module 200 applied to an embodiment of the present invention will be described in detail. Meanwhile, it should be noted that, as long as separate description is not made, the malicious packet determination module 200 is operated as a subject (main entity).

First, the present invention can target anything as long as a mobile device supplied with power from a battery receives TCP packets so as to be offered service by wireless. The present invention is a defense means that can be applied to a mobile device, a smart phone, etc., which makes use of a transmission control protocol (TCP) based network such as a WebPDA or 2G-EVDO cellular network, or a 3G/4G data service cellular network, except a sensor network field, a protocol of which has not yet been defined.

Further, the present invention is embodied in the mobile device, and checks and processes resource consumption type TCP packets, so that it will be a safe countermeasure from a viewpoint of wireless resource management and device resource management, and can be used as a safe defense means when the DoS attacks attempt to provide an initial access through a wireless network.

Figure 7:
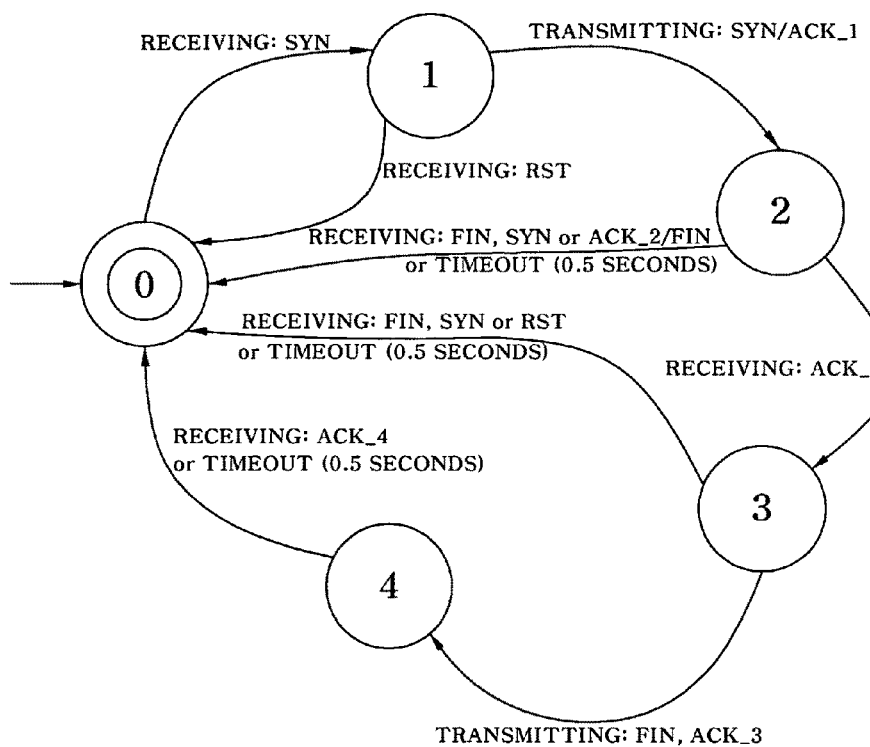
FIG. 7 is a schematic view illustrating the concept of a model for realizing a method of interrupting TCP-based denial-of-service attacks (DoS attacks) against a mobile device in accordance with an embodiment of the present invention.

FIG. 7 is a schematic view illustrating the concept of a model for realizing a method of interrupting TCP-based DoS attacks against a mobile device in accordance with an embodiment of the present invention.

Referring to FIG. 7, the model for realizing a method of interrupting TCP-based DoS attacks against a mobile device is based on first through fifth states (state 0 through state 4), and is variously connected according to a flow of packets, which are transmitted and received between a base station (BS) and a mobile device (MD) (e.g. desktop computer, a laptop computer, a personal digital assistant (PDA), a mobile phone, a WebPDA, a transmission control protocol (TCP) networking assisted wireless mobile device, etc.)

Meanwhile, the model applied to an embodiment of the present invention checks and determines whether or not the packets, which are transmitted and received whenever TCP connection is changed, are compatible with a TCP specification, while monitoring packets transmitted and received between the BS and the MD.

In other words, the present invention is adapted to carry out a checking function according to a TCP state transition, so that it can successively check which state must come next according to a flag of the transceived packet, and what type of flag must be set for the packet in a present state when the packet enters.

Further, one session goes through the steps from the first state (state 0) to the fifth state (state 4), and then returns to the first state (state 0) again with respect to all of the packets entering the MD. A sequence of the packets within one session can be checked by checking these steps, particularly the checking of the packet flags. Thereby, it can be checked whether or not an unnecessary packet has entered. Here, the first state (state 0) means a beginning and end of one session.

Figure 8:
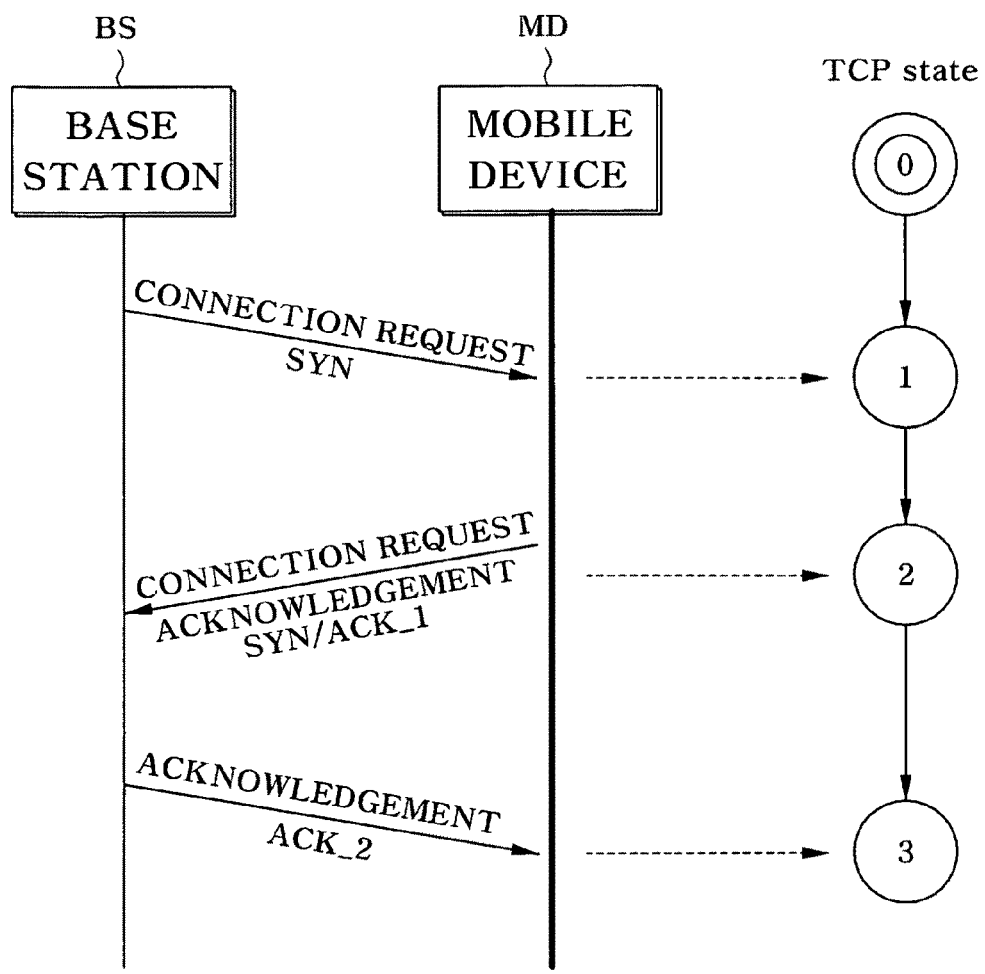
FIG. 8 is a view for explaining the flow of a packet and TCP state transition while TCP connection is normally completed between a base station (BS) and a mobile device (MD)

FIG. 8 is a view for explaining the flow of a packet and TCP state transition while TCP connection is normally completed between BS and MD.

Referring to FIGS. 7 and 8, when created between the BS and the MD in the beginning, a session is in the first state (state 0), which means a beginning and end thereof.

Then, the BS transmits a connection request packet (SYN packet), to which a connection request flag (SYN flag) is set, to a specific port of the MD that is intended for connection. Thus, when it is checked through the present invention that the MD receives the SYN packet transmitted from the BS, a TCP state of the MD is moved from a first state (state 0) to a second state (state 1).

Next, the MD transmits a connection request acknowledgement packet (SYN/ACK__1 packet), to which a connection request flag (SYN flag) is set, to the BS together with acknowledgement that it accepts the connection request. When it is checked through the present invention that the SYN/ACK__1 packet is transmitted from the MD to the BS, the TCP state of the MD is moved from the second state (state 1) to a third state (state 2).

Afterwards, the BS transmits an acknowledgement packet (ACK__2 packet) to the MD in response to the SYN/ACK__1 packet. When it is checked through the present invention that the MD receives the ACK__2 packet transmitted from the BS, the TCP state of the MD is moved from the third state (state 2) to a fourth state (state 3). Thereby, the TCP connection is completed. Thereafter, data is freely transmitted between the BS and MD.

In other words, in order for the MD to receive the TCP packet, the SYN packet must be received when the TCP connection is first attempted. The TCP connection is carried out through three-way handshaking at a place where the TCP connection is attempted.

Thus, when the process, in which the MD transmits the SYN/ACK__1 packet in response to the SYN packet and then receives the ACK__2 packet in response to the SYN/ACK__1 packet, is completed, one TCP connection occurs.

In the present invention, each pointer is provided from the first state (state 0) to the fourth state (state 3) such that the checking process can be performed from the TCP connection to the interior of the MD part step by step. The pointer exists in each step until the three-way handshaking is established starting with the SYN packet that makes an attempt at the TCP connection at first, so that it can immediately find a moment when something is wrong with the checking process. Thus, proper measures of the resulting situation can be taken.

Figure 9:
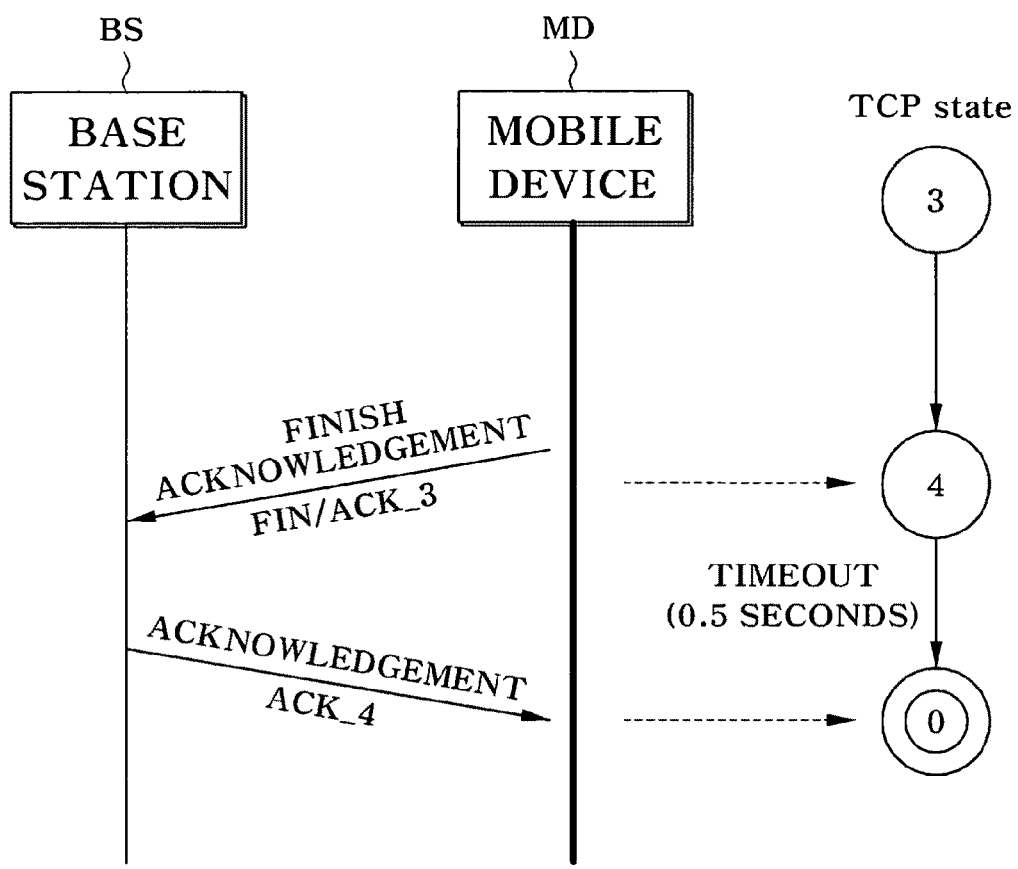
FIG. 9 is a view for explaining the flow of a packet and TCP state transition while TCP connection is normally completed between BS and MD.

FIG. 9 is a view for explaining the flow of a packet and TCP state transition while TCP connection is normally completed between BS and MD.

Referring to FIGS. 7 and 9, in the fourth state (state 3) in which the TCP connection is completed between the BS and the MD, the MD transmits a disconnection acknowledgement packet (FIN/ACK__3 packet), to which a disconnection flag (FIN flag) is set, to a specific port of the BS that is intended to release the TCP connection. Thus, when receiving the FIN/ACK__3 packet transmitted from the MD, the BS transmits an acknowledgement packet (ACK__4 packet), informing that it accepts the disconnection request, to the corresponding MD in response to the FIN/ACK__3 packet.

When it is checked through the present invention that the FIN/ACK__3 packet is transmitted from the MD to the BS, the TCP state of the MD is moved from the fourth state (state 3) to a fifth state (state 4).

Afterwards, the BS transmits the acknowledgement packet (ACK__4 packet) to the MD in response to the FIN/ACK__3 packet. When it is checked through the present invention that the MD receives the ACK__4 packet transmitted from the BS, the TCP state of the MD is moved from the fifth state (state 4) to the first state (state 0). Thereby, the TCP connection is released.

Meanwhile, in the case in which the BS previously releases the TCP connection without transmitting the ACK__4 packet in the fifth state (state 4), timeout is initiated. Thus, the MD is also moved to the first state (state 0) in order to release the TCP connection.

In other words, if the MD fails to receive the ACK__4 packet for a preset timeout time (preferably, about 0.5 seconds), the TCP state of the MD is transited from the fifth state (state 4) to the first state (state 0). Thereby, the TCP connection is safely released.

Now, a method of interrupting TCP-based DoS attacks on the mobile device according to an embodiment of the present invention will be described in detail through various examples of abnormal TCP connection.

In other words, the following description will be made regarding how to check and deny the DoS attacks in the MD using a model applied to the present invention in the situation in which the DoS attacks can occur. The MD can cope with most of the DoS attacks when the TCP connection is incorrectly attempted.

Figure 10:
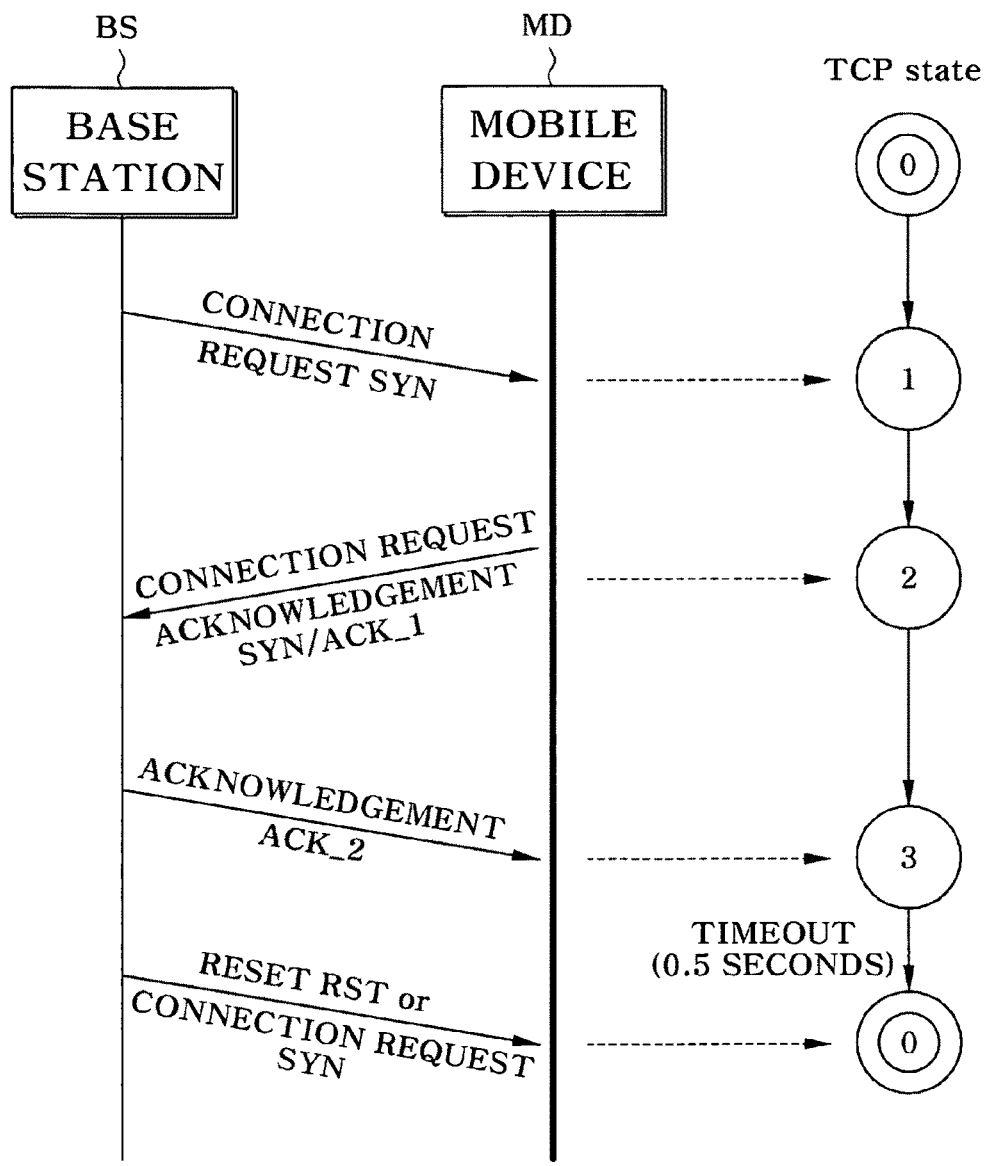
FIG. 10 is a view for explaining the flow of a packet and TCP state transition in a first example of abnormal TCP connection.

FIG. 10 is a view for explaining the flow of a packet and TCP state transition in a first example of abnormal TCP connection.

Referring to FIGS. 7 and 10, when it is checked that the MD receives a SYN packet transmitted from the BS, the TCP state of the MD is moved from a first state (state 0) to a second state (state 1). Then, when it is checked that the MD transmits a SYN/ACK__1 packet to the BS, the TCP state of the MD is moved from the second state (state 1) to a third state (state 2).

Next, when it is checked that the MD receives an ACK__2 packet transmitted from the BS, the TCP state of the MD is moved from the third state (state 2) to a fourth state (state 3). Thereby, the TCP connection is completed.

Afterwards, when it is checked that the MD receives the SYN packet which is transmitted from the BS and to which a reset flag (RST flag) or a connection request flag (SYN flag) is set, the TCP state of the MD is immediately moved from the fourth state (state 3) to the first state (state 0). Thereby, the TCP connection is safely released.

Meanwhile, in the case in which the BS releases the TCP connection without transmitting any packet in the fourth state (state 3), timeout is initiated through the present invention. Thus, the MD is also moved to the first state (state 0) in order to release the TCP connection.

In other words, if the MD receives no packet for a preset timeout time (preferably, about 0.5 seconds), the TCP state of the MD is immediately moved from the fourth state (state 3) to the first state (state 0). Thereby, the TCP connection is safely released.

When collectively considering the description of the abnormal TCP connection of the aforementioned first example, it is frequently found that the SYN packet is continuously transmitted to the MD in a wireless network environment. In this case, the resources of the wireless network are consumed, and the battery of the MD is consumed because the MD is continuously maintained in a wakeup state.

Thus, in the case in which the RST packet or the SYN packet enters after three-way handshaking, this packet is regarded to be an incorrect packet. Thus, the MD is processed as follows. The TCP state is moved from the first state (state 0) to the fourth state (state 3), and then returns to the first state (state 0) again such that the MD no longer receives the packet.

Figure 11:
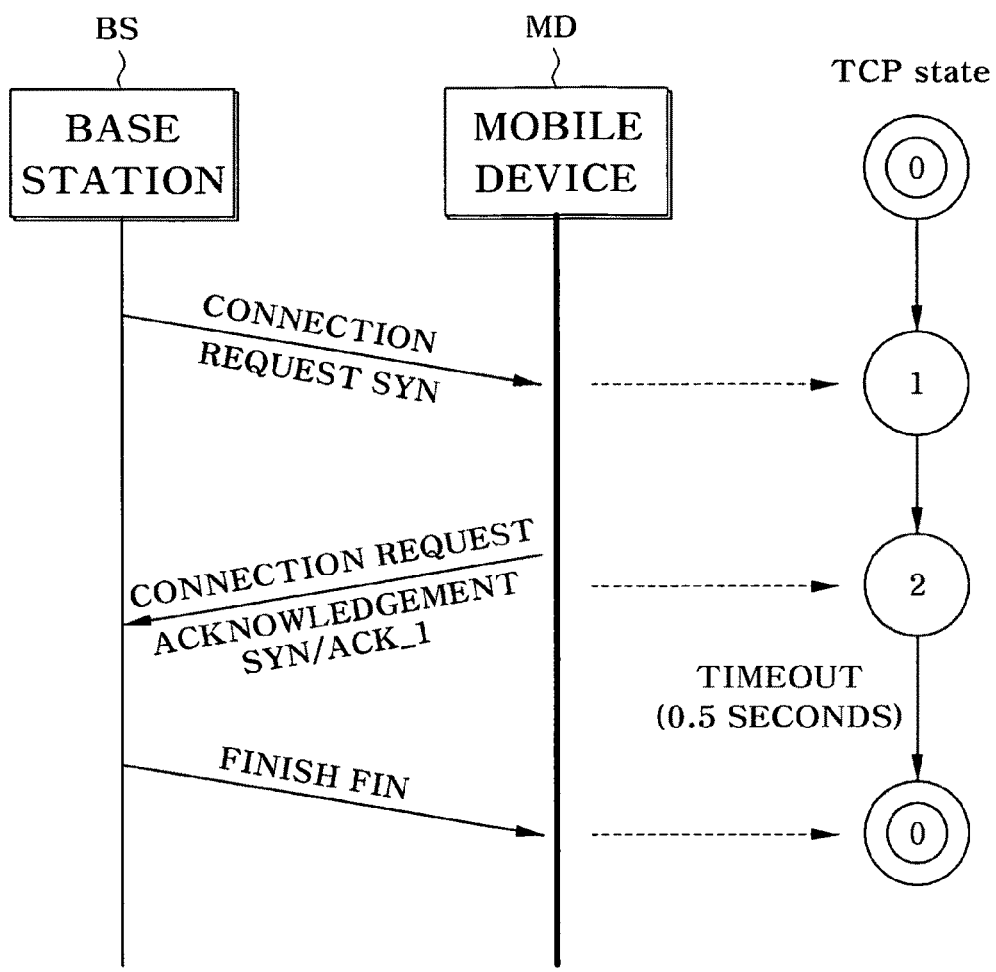
FIG. 11 is a view for explaining the flow of a packet and TCP state transition in a second example of abnormal TCP connection.

FIG. 11 is a view for explaining the flow of a packet and TCP state transition in a second example of abnormal TCP connection.

Referring to FIGS. 7 and 11, when it is checked that the MD receives a SYN packet transmitted from the BS, the TCP state of the MD is moved from a first state (state 0) to a second state (state 1). Then, when it is checked that the MD transmits a SYN/ACK_1 packet to the BS, the TCP state of the MD is moved from the second state (state 1) to a third state (state 2).

Next, when the MD receives a disconnection packet (FIN packet) transmitted from the BS, it is determined that the TCP connection is abnormally released. Thus, the TCP state of the MD is immediately moved from the third state (state 2) to the first state (state 0). Thereby, the TCP connection is safely released.

Meanwhile, in the case in which the BS abnormally releases the TCP connection without transmitting any packet in the third state (state 2), timeout is initiated through the present invention. Thus, the MD is also moved to the first state (state 0) in order to release the TCP connection.

In other words, if the MD receives no packet for a preset timeout time (preferably, about 0.5 seconds), the TCP state of the MD is immediately moved from the third state (state 2) to the first state (state 0). Thereby, the TCP connection is safely released.

When collectively considering the description of the abnormal TCP connection of the aforementioned second example, the second example is applied to the case in which the FIN packet is abruptly transmitted during the three-way handshaking. The operating system of the MD waits for the ACK_2 packet to enter in order to finish the three-way handshaking.

However, when receiving an unexpected FIN packet from the BS, the MD continues to stand by in the wakeup state, and thus consumes its battery. Thus, in this case, the consumption of the resources can be prevented only when the MD is moved from the first state (state 0) to the third state (state 2) and then returns to the first state (state 0), and releases the TCP connection.

In other words, by checking that the MD is moved from the first state (state 0) to the third state (state 2) and then returns to the first state (state 0), and then releasing the TCP connection, a problem on the battery consumption or resource allocation can be effectively resolved.

Figure 12:
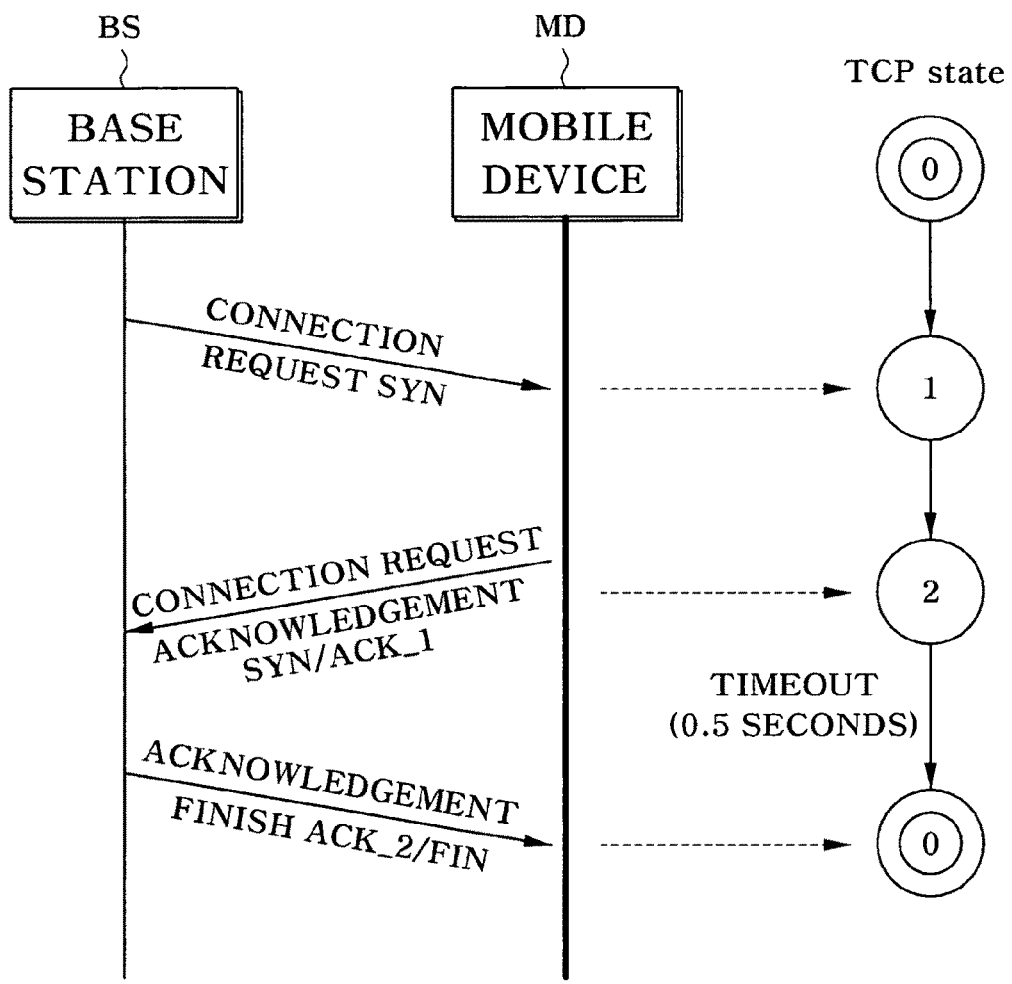
FIG. 12 is a view for explaining the flow of a packet and TCP state transition in a third example of abnormal TCP connection.

FIG. 12 is a view for explaining the flow of a packet and TCP state transition in a third example of abnormal TCP connection.

Referring to FIGS. 7 and 12, the third example is applied to the case in which a FIN packet is transmitted as if the three-way handshaking was finished. First, when it is checked that the MD receives a SYN packet transmitted from the BS, the TCP state of the MD is moved from a first state (state 0) to a second state (state 1). Then, when it is checked that the MD transmits a SYN/ACK_1 packet to the BS, the TCP state of the MD is moved from the second state (state 1) to a third state (state 2).

Next, the BS transmits an acknowledgement disconnection packet (ACK_2/FIN packet), to which a FIN flag is set, to the MD together with acknowledgement (ACK_2) in response to the SYN/ACK_1 packet. When it is checked through the present invention that the MD receives the ACK_2/FIN packet transmitted from the BS, the TCP state of the MD is immediately moved from the third state (state 2) to the first state (state 0). Thereby, the TCP connection is safely released.

Meanwhile, in the case in which the BS abnormally releases the TCP connection without transmitting any packet in the third state (state 2), timeout is initiated through the present invention. Thus, the MD is also moved to the first state (state 0) in order to release the TCP connection.

In other words, if the MD receives no packet for a preset timeout time (preferably, about 0.5 seconds), the TCP state of the MD is immediately moved from the third state (state 2) to the first state (state 0). Thereby, the TCP connection is safely released.

Figure 13:
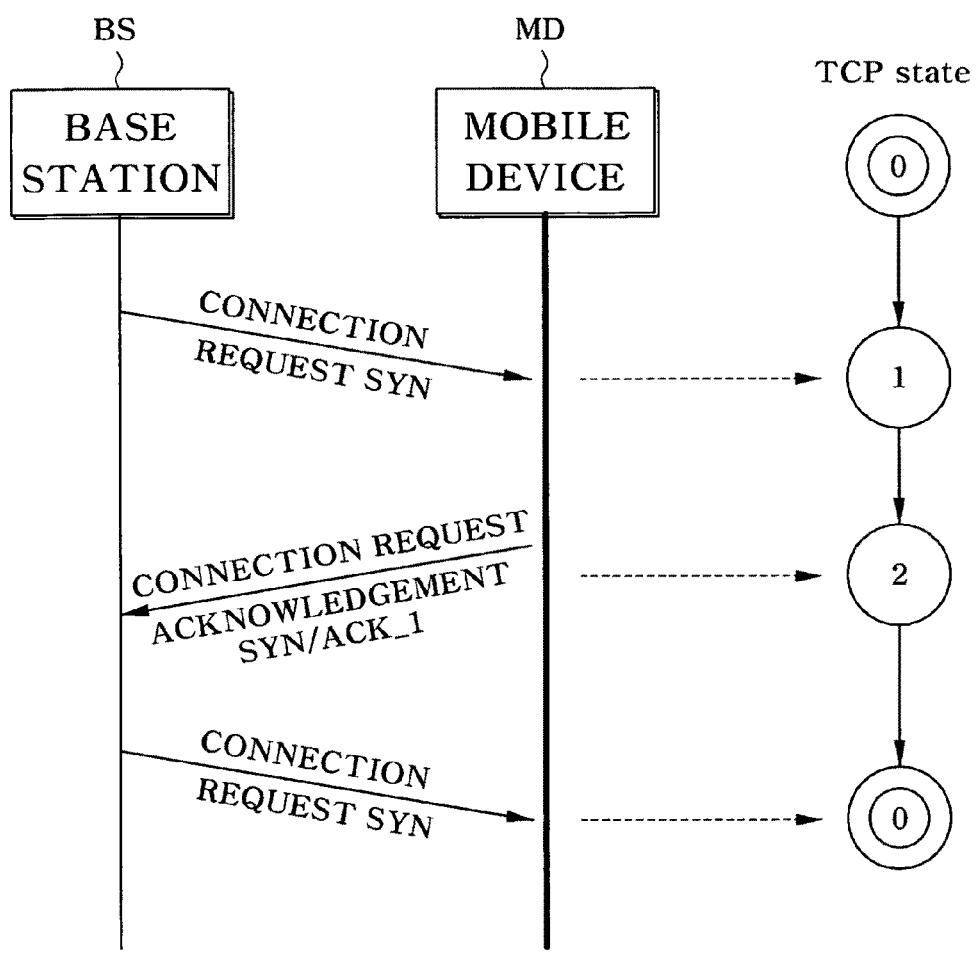
FIG. 13 is a view for explaining the flow of a packet and TCP state transition in a fourth example of abnormal TCP connection.

FIG. 13 is a view for explaining the flow of a packet and TCP state transition in a fourth example of abnormal TCP connection.

Referring to FIGS. 7 and 13, when it is checked that the MD receives a SYN packet transmitted from the BS, the TCP state of the MD is moved from a first state (state 0) to a second state (state 1). Then, when it is checked that the MD transmits a SYN/ACK_1 packet to the BS, the TCP state of the MD is moved from the second state (state 1) to a third state (state 2).

At this time, the BS may continue to transmit the identical SYN packet in the third state (state 2). In this case, when it is checked through the present invention that the MD receives the SYN packet transmitted from the identical BS, the TCP state of the MD is immediately moved from the third state (state 2) to the first state (state 0). Thereby, the TCP connection is safely released.

When collectively considering the description of the abnormal TCP connection of the aforementioned fourth example, the fourth example is applied to the case in which the identical SYN packet is transmitted during the three-way handshaking. This means that the SYN packet is transmitted such that the MD continues to maintain a wakeup state. According to the method of the present invention, the TCP state of the MD is adapted to be moved from the first state (state 0) to the third state (state 2), and then return to the first state (state 0) again when the MD receives the identical SYN packet. Thereby, the TCP connection is safely released. As a result, the battery consumption of the MD and the wireless resource depletion can be effectively prevented.

FIG. 14 is a view for explaining the flow of a packet and TCP state transition in a fifth example of abnormal TCP connection, in which timeout is applied when the TCP connection is released.

Referring to FIGS. 7 and 14, in the case in which the MD intends to release the TCP connection in the fourth state (state 3), i.e. in the state where the TCP connection is completed between the BS and the MD, the MD transmits a disconnection acknowledgement packet (FIN/ACK_1 packet) to the BS, and then waits for an ACK_2 packet from the BS in the state in which the TCP state thereof is moved from the fourth state (state 3) to a fifth state (state 4). At this time, when no response is given for a preset timeout time (preferably, about 0.5 seconds), the TCP state of the MD is immediately transited from the fifth state (state 4) to the first state (state 0) so as to induce the MD to release the TCP connection without any measure. Thereby, the TCP connection is safely released.

Meanwhile, the method of performing a self-defense function against virus and network-based attacks according to an exemplary embodiment of the present invention can be realized in computer readable media as computer readable codes. Here, the computer readable media include all types of recording devices in which computer readable data is stored.

Examples of the computer readable media include a read-only memory (ROM), a random access memory (RAM), a CD-ROM, a magnetic tape, a hard disk, a floppy disk, a mobile storage device, a non-volatile memory (flash memory), an optical data storage device, and so forth, and also anything that is realized in the form of a carrier wave (e.g. transmission over the Internet).

Further, the computer readable media are distributed among computer systems connected through a computer communication network, and can be stored and executed as a code that can be read in a distribution type.

As described above, according to the mobile device having a self-defense function against virus and network-based attacks and a self-defense method using the same of the present invention, unlike an existing method of detecting the virus depending on information on virus signatures, it determines by itself, without using virus information, whether or not the file is infected with a virus using an artificial intelligence method involving distribution of similarity between data, so that it can prevent damage caused by the virus in advance, and effectively protect against a DoS attack that continuously transmits TCP packets to a mobile device in a wireless environment by use of a TCP protocol, which not only depletes wireless network resources but also consumes power of a battery of the mobile device.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A mobile device for wireless communication comprising:
    a network packet monitoring module configured to receive a transmission control protocol (TCP) packet from a network and determine at least one of a TCP packet type of the TCP packet and a TCP flag set in the TCP packet;
    a malicious packet determination module configured to receive the at least one of the TCP packet type and the TCP flag from the network packet monitoring module and determine whether the at least one of the TCP packet type and the TCP flag conforms to a TCP session state transition between a current TCP session state of the mobile device and a next TCP session state of the mobile device in a TCP session state flow of a TCP session between the mobile device and a source of the TCP packet received by the network packet monitoring module; and
    a control module configured to control the network packet monitoring module to discard the TCP packet and terminate the TCP session between the mobile device and the source of the TCP packet, in response to the malicious packet determination module determining that the at least one of the TCP packet type and the TCP flag does not conform to the TCP session state transition between the current TCP session state of the mobile device and the next TCP session state of the mobile device in the TCP session state flow.

2. The mobile device as set forth in claim 1, wherein the mobile device is one of a desktop computer, a laptop computer, a personal digital assistant (PDA), a mobile phone, a WebPDA, and a transmission control protocol (TCP) networking assisted wireless mobile device.

3. The mobile device as set forth in claim 1, wherein the malicious packet determination module is configured to set the current session state of the mobile device to indicate that the TCP session is established between the mobile device and the source, determine that no packets are received within a preset timeout time after the TCP session is established, determine that the TCP session is abnormally terminated in response to determining no packets are received within the preset timeout time, and release the TCP session in response to determining that the TCP session is abnormally terminated.

4. The mobile device as set forth in claim 1, wherein the TCP session state flow comprises:
    a first session state in which the mobile device receives a SYN packet for TCP connection to the mobile device;
    a second session state in which the mobile device transmits a SYN/ACK__1 packet in response to the mobile device receiving the transmitted SYN packet;
    a third session state in which the mobile device receives an acknowledgement packet ACK__2 and the TCP session is established, in response to the mobile device transmitting the SYN/ACK__1 packet;
    a fourth session state in which the mobile device transmits a disconnection packet (FIN packet) in response to receiving the ACK__2 packet; and
    a fifth session state in which the mobile device receives an acknowledgement packet FIN/ACK__3 and interrupts the TCP session, in response to the mobile device transmitting the FIN packet.

5. The mobile device as set forth in claim 4, wherein the current TCP session state is the second session state, and the malicious packet determination module is configured to interrupt the TCP session in response to receiving an acknowledgement disconnection packet (ACK__2/FIN packet), to which a FIN flag is set, together with acknowledgement (ACK__2) in response to transmitting the SYN/ACK__1 packet.

6. The mobile device as set forth in claim 4, wherein the current TCP session state is the second session state, and the malicious packet determination module is configured to interrupt the TCP connection in response to receiving the SYN packet.

7. The mobile device as set forth in any one of claims 5 to 6, wherein the malicious packet determination module is configured to determine that no packets are received within a preset timeout time after the SYN/ACK__1 packet is transmitted in the second session state, determine that the TCP session is abnormally terminated in response to determining no packets are received within the preset timeout time, and release the TCP session in response to determining that the TCP session is abnormally terminated.

8. The mobile device as set forth in claim 4, wherein the current session state is the fourth session state, and the malicious packet determination module is configured to determine that the acknowledgement packet FIN/ACK__3 is not received within a preset timeout time after transmitting the disconnection packet (FIN packet) and release the TCP session in response to determining that the acknowledgement packet FIN/ACK__3 is not received within preset timeout.

9. A method of performing a self-defense function against network-based attacks on a mobile device, the method comprising the steps of:
    receiving a transmission control protocol (TCP) packet from a network;
    determining at least one of a TCP packet type of the TCP packet and a TCP flag set in the TCP packet;
    determining whether the at least one of the TCP packet type and the TCP flag conforms to a TCP session state transition between a current TCP session state of the mobile device and a next TCP session state of the mobile device in a TCP session state flow of a TCP session between the mobile device and a source of the TCP packet; and
    discarding the TCP packet and terminating the TCP session between the mobile device and the source of the TCP packet, in response to determining that the at least one of the TCP packet type and the TCP flag does not confirm to the TCP session state transition between the current TCP session state of the mobile device and the next TCP session state of the mobile device in the TCP session state flow.

10. The method as set forth in claim 9, further comprising:
setting the current session state of the mobile device to indicate that the TCP session is established between the mobile device and the source;
determining that no packets are received within a preset timeout time after the TCP session is established;
determining that the TCP session is abnormally terminated in response to determining no packets are received within the preset timeout time; and
releasing the TCP session in response to determining that the TCP session is abnormally terminated.

11. The method as set forth in claim 9, wherein the TCP session state flow comprises:
a first session state in which the mobile device receives a SYN packet for TCP connection to the mobile device;
a second session state in which the mobile device transmits a SYN/ACK_1 packet in response to the mobile device receiving the transmitted SYN packet;
a third session state in which the mobile device receives an acknowledgement packet ACK_2 and the TCP session is established, in response to the mobile device transmitting the SYN/ACK_1 packet; a fourth session state in which the mobile device transmits a disconnection packet (FIN packet) in response to receiving the ACK_2 packet; and
a fifth session state in which the mobile device receives an acknowledgement packet FIN/ACK_3 and interrupts the TCP session, in response to the mobile device transmitting the FIN packet.

12. The method as set forth in claim 11, wherein the current TCP session state is the second session state, and the method further comprises interrupting the TCP session in response to receiving an acknowledgement disconnection packet (ACK_2/FIN packet), to which a FIN flag is set, together with acknowledgement (ACK_2) in response to transmitting the SYN/ACK_1 packet.

13. The method as set forth in claim 11, wherein the current TCP session state is the second session state, and the method further comprises interrupting the TCP connection in response to receiving the SYN packet.

14. The method as set forth in one of claims 12 and 13, further comprising:
determining that no packets are received within a preset timeout time after the SYN/ACK_1 packet is transmitted in the second session state;
determining that the TCP session is abnormally terminated in response to determining no packets are received within the preset timeout time; and
releasing the TCP session in response to determining that the TCP session is abnormally terminated.

15. The method as set forth in claim 11, wherein the current session state is the fourth session state, and the method further comprises:
determining that the acknowledgement packet FIN/ACK_3 is not received within a preset timeout time after transmitting the disconnection packet (FIN packet); and
releasing the TCP session in response to determining that the acknowledgement packet FIN/ACK_3 is not received within preset timeout.

16. A non-transitory computer readable medium recording a program that causes a computer to execute a method of performing a self-defense function against network-based attacks on a mobile device, the method comprising the steps of:
receiving a transmission control protocol (TCP) packet from a network;
determining at least one of a TCP packet type of the TCP packet and a TCP flag set in the TCP packet;
determining whether the at least one of the TCP packet type and the TCP flag conforms to a TCP session state transition between a current TCP session state of the mobile device and a next TCP session state of the mobile device in a TCP session state flow of a TCP session between the mobile device and a source of the TCP packet; and
discarding the TCP packet and terminating the TCP session between the mobile device and the source of the TCP packet, in response to determining that the at least one of the TCP packet type and the TCP flag does not confirm to the TCP session state transition between the current TCP session state of the mobile device and the next TCP session state of the mobile device in the TCP session state flow.

* * * * *